US007912958B2

(12) United States Patent
Giglio et al.

(10) Patent No.: US 7,912,958 B2
(45) Date of Patent: Mar. 22, 2011

(54) METHOD AND APPARATUS FOR AUTOMATIC IP ALLOCATION BOOTSTRAPPING OF EMBEDDED NETWORK MANAGEMENT CARDS USED IN NETWORKED UNINTERRUPTIBLE POWER SUPPLIES AND OTHER SUPPORTED DEVICES

(75) Inventors: Scott Giglio, Warwick, RI (US); Christopher Leidigh, Providence, RI (US)

(73) Assignee: American Power Coversion Corporation, West Kingston, RI (US)

( * ) Notice: Subject to any disclaimer, the term of this patent is extended or adjusted under 35 U.S.C. 154(b) by 655 days.

(21) Appl. No.: 10/225,569

(22) Filed: Aug. 21, 2002

(65) Prior Publication Data

US 2004/0039821 A1 Feb. 26, 2004

(51) Int. Cl.
*G06F 15/16* (2006.01)
*G06F 16/173* (2006.01)

(52) U.S. Cl. .......................... 709/227; 709/224

(58) Field of Classification Search .................. 709/227, 709/223, 224; 713/340
See application file for complete search history.

(56) References Cited

U.S. PATENT DOCUMENTS

| | | | | |
|---|---|---|---|---|
| 6,430,622 B1 * | 8/2002 | Aiken et al. | | 709/245 |
| 6,496,858 B1 * | 12/2002 | Frailong et al. | | 709/221 |
| 6,990,591 B1 * | 1/2006 | Pearson | | 726/22 |
| 7,058,712 B1 * | 6/2006 | Vasko et al. | | 709/224 |
| 7,068,647 B2 * | 6/2006 | Fangman et al. | | 370/352 |
| 7,151,966 B1 * | 12/2006 | Baier et al. | | 700/19 |
| 2003/0033550 A1 * | 2/2003 | Kuiawa et al. | | 713/340 |
| 2003/0106067 A1 * | 6/2003 | Hoskins et al. | | 725/119 |
| 2003/0154285 A1 * | 8/2003 | Berglund et al. | | 709/227 |
| 2003/0217110 A1 * | 11/2003 | Weiss | | 709/207 |
| 2004/0010569 A1 * | 1/2004 | Thomas et al. | | 709/220 |
| 2004/0242703 A1 * | 12/2004 | Roe | | 514/693 |
| 2006/0031488 A1 * | 2/2006 | Swales | | 709/224 |
| 2007/0183426 A1 * | 8/2007 | Daude et al. | | 370/392 |

OTHER PUBLICATIONS

RFC 1541.*
RFC 1497.*
RFC 1534—Interoperation Between DHCP and BootP.*
Bahlmann "BootP, DHCP, and TFTP Implementation" discloses the implementation of utilizing BootP and DHCP and assigned IP address to the user.*
JP 2001285305 translation pp. 1-8.*
JP 2000078169 translation pp. 1-18.*
RFC 951, http://www.faqs.org/rfcs/rfc951.html, 11 pages.
RFC 2131, http://www.faqs.org/rfcs/rfc2131.html, 35 pages.

* cited by examiner

*Primary Examiner* — Karen C Tang
(74) *Attorney, Agent, or Firm* — Lando & Anastasi, LLP (57) ABSTRACT

The present invention relates to a Network Management Card enabling communications to supported devices, for example, an uninterruptible power supply (UPS) connected to a network. The Network Management Card operates to provide IP allocation according to BootP and DHCP processes, to automatically select an appropriate process, and apply it automatically and intuitively without specific operator interference or configuration. The Network Management Card further utilizes vendor specific codes in the DHCP process to limit the IP addresses assigned to UPSs in order to maintain information about the location of the UPSs on the network.

21 Claims, 3 Drawing Sheets

METHOD AND APPARATUS FOR AUTOMATIC IP ALLOCATION BOOTSTRAPPING OF EMBEDDED NETWORK MANAGEMENT CARDS USED IN NETWORKED UNINTERRUPTIBLE POWER SUPPLIES AND OTHER SUPPORTED DEVICES

CROSS-REFERENCE TO RELATED APPLICATIONS

Not applicable.

STATEMENT REGARDING FEDERALLY SPONSORED RESEARCH

Not applicable.

REFERENCE TO MICROFICHE APPENDIX

Not applicable.

BACKGROUND OF THE INVENTION

The present invention relates to a process for bootstrapping IP allocations of embedded Network Management Cards for networked uninterruptible power supplies and other devices. More particularly, it relates to a method and apparatus for automatic selection and operation of IP allocation for a networked uninterruptible power supply or other supported device according to one of the following protocols Dynamic Host Control Protocol, BootP protocol, gleaning and static IP allocation.

Data communications networks are widespread and there are many different types of networks, including LANs (Local Area Networks), MANs (Metropolitan Area Networks), and WANs (Wide Area Networks). They are used for providing numerous services, both for companies and for individuals. They provide a powerful communication mechanism and allow access to various kinds of remote information. Two or more networks connected together form an internetwork (or internet). The "Internet" is a worldwide internet widely used to connect universities, government offices, companies, and private individuals. Every host (or end-user's machine running user applications) and router interface on the Internet has an IP address, which encodes its network number and host number. The combination is unique and no two machines have the same IP address. IP addresses are typically 32 bits long and are used in the source address and destination address fields of IP packets. The Source Address is the ultimate source of the IP packet; the Destination Address is the ultimate destination of the IP packet.

A number of mechanisms and facilities have been developed in the prior art to deal with assigning IP addresses. For example, the IP address for an uninitialized network server/host system has typically been determined through the BootP Protocol, the Dynamic Host Configuration Protocol (DHCP), the Reverse Address Resolution Protocol (RARP), or the use of Uni-Cast Ethernet/IP packets, all of which are well known to those of ordinary skill in the relevant arts. In a like manner, DHCP has commonly been used for IP address validation and rediscovery. The most common are the BootP Protocol and The DHCP, which is an extension of the BootP Protocol.

All of the devices on a network need to be configured to operate in accordance with the design of the network. Furthermore, a network administrator must be able to control the network and to prevent conflicts between devices and addresses on a network. Originally, networks had to be manually configured. For manual configuration, the network information, including the IP addresses were assigned individually to each device on the network. In order to make a change, each device would have to be separately changed. As networks increased in size, this became increasingly cumbersome. The BootP Protocol eliminates the need for manual configuration. When the BootP protocol is used to assign an IP address, a network device requests configuration information, including IP addresses, from a BootP server. The configuration information has to be entered into the BootP server, but the information does not have to be entered separately on each device. To make changes in the network, only the information on the BootP server needs to be changed. The BootP process is fully described in Request For Comments (RFC) 951 and any subsequent amendments thereto, incorporated herein, in its entirety, by reference.

With increases in network size, maintaining unique IP addresses becomes more difficult. The number of IP addresses is fixed by the address length. Therefore, a method developed to provide dynamic assignment of IP addresses. The DHCP is used for dynamic IP address allocation. DHCP is fully described in the Request For Comments (RFC) 2131 and any subsequent amendments thereto, incorporated herein in its entirety by reference. DHCP is primarily a protocol for assigning a dynamic Internet Protocol (IP) address to devices on a network. Accordingly, DHCP permits the automatic configuration of IP parameters on network devices. However these configuration parameters are interface specific, and do not include global or non-interface specific configuration parameters, such as for example router parameters.

The Dynamic Host Configuration Protocol (DHCP) has been developed to provide an automated assignment of IP addresses and to help solve the shortage of IP addresses. Conventional DHCP operation is as follows: When a DHCP client computer attempts an Internet connection, it broadcasts a DHCP request asking for any DHCP server on the network to provide it with an IP address and configuration parameters. A DHCP server on the network that is authorized to configure this client will offer an IP address by sending a reply to the client. Upon receiving this offer, the client may decide to accept it or wait for additional offers from other DHCP servers on the network. At the end, the client chooses and accepts one offer, and the chosen DHCP server sends an acknowledgement with the offered IP address having an associated "lease" time (and any other configuration parameters the client might have requested). During the lifetime of the lease, the client will repeatedly ask the server to renew. If the client chooses not to renew or if the client machine is shut down, the lease eventually expires. Once the lease expires, the IP address can be "recycled" and given to another machine.

The same IP address may not be issued to more than one user on the network. DHCP servers commonly verify addresses by using a "ping" service to determine that an IP address is not already in use. The ping utility broadcasts packets with a specific IP destination address. If there is a computer using that IP address on the network, it sends back a reply. However, this ping utility only works effectively in a small system such as a LAN and when all users on the network are running their computers. Also, depending upon the network load, routers are not obliged to respond to pings, hence ping is an unreliable mechanism. Ping is governed by the ICMP protocol known to those of ordinary skill in the art.

While DHCP simplifies the process for automatic assignment of IP addresses, it increases the difficulties of controlling the network. Specifically, since the IP address of a particular client device may change upon each initialization, locating a specific device on the network is difficult. All of the devices need to be accessed by a Ping to determine the address and location of each device. When different types of devices are present on a network, the location of certain types of devices may be important to a network administrator. For example, when uninterruptible power supplies (UPS) are used in a network, the network administrator may wish to address each of these devices. Within a DHCP network, the location and addresses of UPSs remain unknown. Therefore, a need exists for a system which allows the location of specific devices to be known within a dynamic IP address allocation system.

Additionally, a client device must operate according to the IP allocation protocol of the network to which it is connected. A DHCP client will not function with a BootP server. However, a DHCP server can be configured to accommodate BootP devices. Nevertheless, a need exists for a client communication system which can operate according to different IP allocation processes and which automatically selects an appropriate process depending upon the network to which it is attached.

SUMMARY OF THE INVENTION

The present invention substantially overcomes the deficiencies of the prior art by providing a system for automatic control of the IP allocation process during bootstrap of the device. According to an aspect of the invention, a Network Management Card (NMC) associated with, for example, an uninterruptible power supply, includes a procedure for manual or dynamic and adaptive IP allocation bootstrapping. Depending upon a setting of the NMC, the IP allocation process which occurs during bootstrap may utilize a static IP address entered manually, a dynamically assigned IP address using the assignment methods employed by the DHCP protocol, the BootP protocol, or a combination of protocols. The different protocols are utilized within a single NMC at the time of bootstrap to allow for automatic connections to different networks with different IP address allocation schemas. The automatic nature of the protocol utilization eliminates the need to individually configure network information on each of the NMCs or on the devices to which they provide access. Configuration of network connectivity settings can be accomplished remotely and automatically.

According to another aspect of the present invention, vendor specific information within the DHCP protocol is utilized to control allocation of IP addresses. The DHCP servers are configured to provide certain IP addresses from the IP address pool upon receipt of a request with vendor specific information. The response by the DHCP server providing an IP address also includes vendor specific information so that the NMC can determine that the IP address is acceptable and properly configured. Furthermore, according to another aspect of the invention, an improperly configured IP address is accepted and immediately released in order to free resources for the network.

DETAILED DESCRIPTION

Figure 1:
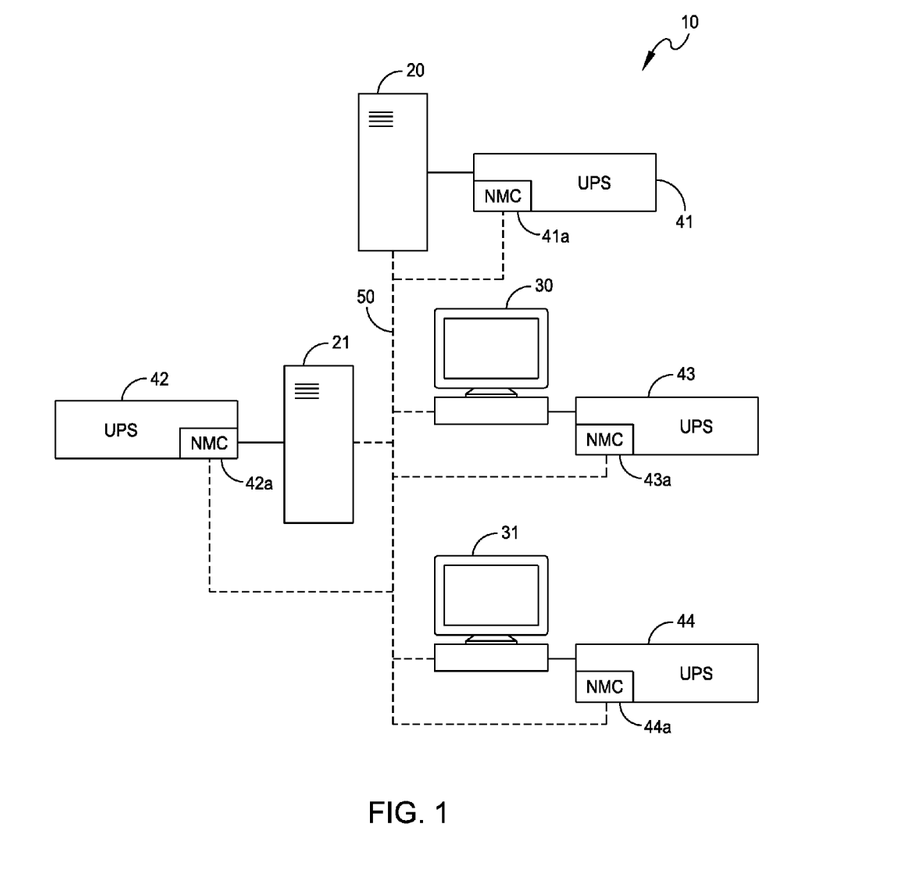
FIG. 1 is a block diagram of a network including uninterruptible power supplies according to an embodiment of the present invention.

The present invention relates to operation of network-capable devices present in a network which are accessed by Network Management Cards—for example, uninterruptible power supplies (UPS). A UPS provides power to an attached computer or computers if the primary power source is lost. Generally, a UPS includes a battery and an inverter for converting the battery power to alternating current necessary to operate computer equipment. The UPS monitors the primary power source. If the voltage of the primary power source falls below a specified level, the UPS disconnects from the primary power source and outputs power from the battery. Power is output from the battery until the primary power source returns or the battery becomes depleted. Current UPSs can determine and provide information about their operating status, including which power source is being used, how much charge remains on the battery, and how long the battery power is estimated to last. The information determined by the UPS can be communicated to its corresponding computer. Additionally, the UPS can be connected to a network to provide communications regarding its status to any location on the network. FIG. 1 illustrates a network 10 which includes UPSs 41, 42, 43, 44. The network illustrated in FIG. 1 includes two servers 20, 21 and two client computers 30, 31. Each of the servers 20, 21 and client computers 30, 31 receives power from a corresponding UPS 41, 42, 43, 44. Communication lines 50 connect the servers 20, 21, client computers 30, 31, and UPSs 41, 42, 43, 44. The network 10 in FIG. 1 is merely illustrative of a network. Any number of servers, client computers, and UPSs may be interconnected in any topology.

Safe, fast, remote network management is a necessity in today's business environment. As devices continue to evolve into increasingly smarter network appliances, the relationship between power availability and network availability becomes even more critical. Network administrators must be able to control their entire infrastructure with absolute confidence. The present invention operates to establish communications between the UPSs 41, 42, 43, 44 and the servers 20, 21 in the network 10 to provide enhanced control for network administrators. Each UPS or other supported device includes a Network Management Card (NMC) 41a, 42a, 43a, 44a for establishing and controlling communications in the network. NMCs used in connection with UPSs and other supported devices are generally known to those of skill in the art of UPS design and operation. The NMCs provide robust management of UPSs and other supported devices via multiple open standards like Telnet, HTTP, FTP, and SNMP. They are full-featured, robust power management products. They may include built in web interface and Email capabilities which eliminates the necessity of an SNMP NMS. This functionality brings remote UPS management to everyone who needs it. Using the 10BaseT and 10/100BaseT Network Management Cards, the UPSs can be monitored and configured to shut down and reboot the corresponding computer systems, send Email alerts and view event logs. The NMCs provide many additional features, which are not part of the invention.

Figure 2:
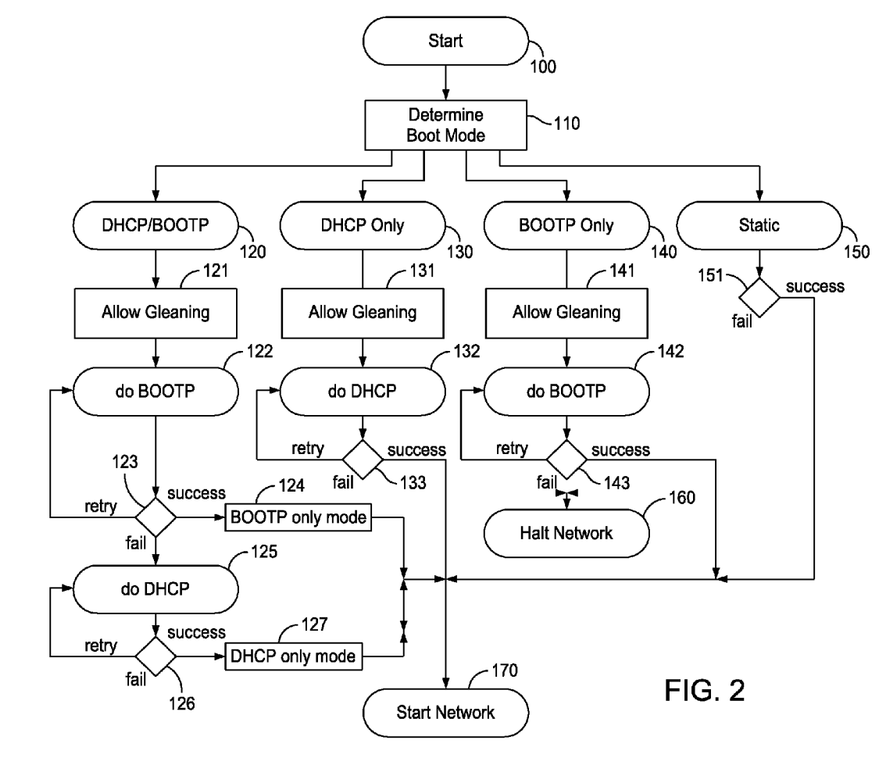
FIG. 2 is a block flow diagram of an IP allocation bootstrapping process according to an embodiment of the present invention.

The present invention relates to the operation of the NMCs to establish a connection to the network 10 from any device supported by an NMC, including UPSs. In order to establish a connection to the network, an IP allocation is required. However, different networks utilize different IP allocation bootstrapping processes. The NMCs of the present invention accommodate different IP allocation bootstrapping processes using multiple protocols implemented uniquely. FIG. 2 illustrates an embodiment of a bootstrapping process implemented in NMCs of the present invention. The bootstrapping process is used to determine and register an IP address for the NMC on the network. The bootstrapping process of FIG. 2 is performed each time the NMC is commences operation or is reset. The process is required to connect the NMC to the network.

The bootstrapping process commences at step 100 and determines a boot mode at step 110. The boot mode is determined according to prior settings in the NMC. The default mode is DHCP/BootP 120. This mode is used whenever a different mode has not already been established. Alternatively, a DHCP Only mode 130, a BootP Only mode 140 or a Static mode 150 may be used.

In the DHCP/BootP mode 120, the first step is to allow Gleaning 121. Gleaning is a known process for assigning and registering IP addresses. In gleaning, an ARP Cache may include a designated IP address corresponding to the MAC address of the NMC. If an IP address is designated, the server sends a PING to the NMC with the address information. However, the present invention limits the use of a PING in order to control network configuration information. The PING must be an ICMP packet having a particular buffer size. The gleaned IP address is accepted by the NMC only if these conditions are met. In this manner, the NMC of the present invention ensures that the gleaned IP address is correct for communications among supported devices and avoids use of a random IP assignment found in the standard ARP cache implementation.

If the IP assignment is not made by gleaning, a BootP process is initiated. The BootP process used in the NMC of the present invention operates in the same manner as is generally known. The NMC sends a request for a network assignment from any server on the network and waits for a valid assignment response. If the servers 20, 21 include a BootP server or a DHCP server which includes a configuration for the NMC, the BootP process will result in assignment of an IP address and establishment of a network connection for the NMC. If the BootP process succeeds, the boot mode will be set to "BootP Only mode" (step 124) and the NMC will start operating on the network (step 170). If a valid BootP assignment response is not received, the NMC will retry the BootP process.

If a valid BootP assignment is not received after five tries, a DHCP process 125 is initiated. The DHCP process of the present invention is generally known. The NMC sends a DHCPDISCOVER packet requesting an IP address from any DHCP server on the network. The DHCPDISCOVER packet includes a vendor specific option identifying the NMC as being associated with a UPS. Any DHCP server on the network will respond to the DHCPDISCOVER packet by sending a DHCPOFFER packet which contains an available IP address from its pool of IP addresses. If the DHCP server has been configured to operate with the present invention, the IP address is limited to a pool corresponding to the vendor specific information in the DHCPDISCOVER packet. Also the DHCPOFFER packet will include a cookie corresponding to the vendor specific information. If a DHCPOFFER packet is not received, the DHCP process 125 will be retried. If a DHCPOFFER packet does not contain the necessary cookie, the NMC of the present invention will accept the offered IP address lease and immediately release it. The lack of the proper cookie is considered a failure of the process, and the DHCP 125 process is retried. If the DHCPOFFER packet does include the required cookie, the boot mode is set to "DHCP Only mode" (step 127) and the NMC starts operating on the network (step 170).

If a valid DHCPOFFER packet is not received after five retries, then the BootP process is tried again. Of course, the present invention is not limited to any specific number of retries. The NMC could alternate between the BootP and DHCP processes after any number of retries. According to an embodiment of the present invention, a BootP request may be sent every 32 seconds for 12 minutes, followed by a single DHCP request with a timeout of 64 seconds. The BootP and DHCP processes will be alternately tried until a valid response is received. Alternatively, the NMC may stop sending request after a specified period of time or after a specified number of tries.

Thus, in the DHCP/BootP process 120, the NMC will receive an IP allocation using a BootP process if the NMS has been configured on the network. Alternatively, the NMC will receive an IP allocation using a DHCP process if the required cookie is present. In this manner, the IP address received from the DHCP processes is limited by the vendor specific information in the DHCPDISCOVER packet. Since the IP addresses used for the NMCs are limited, the network administrator can easily locate UPSs on the network.

The DHCP Only mode 130 is used when the NMC was previously booted using a DHCP process. The first step of the DHCP Only mode 130 is to allow Gleaning 131. Gleaning in this mode operates in the same manner as discussed above. If an IP address is not provided by gleaning, then the DHCP process begins. The NMC sends a DHCPDISCOVER packet including the vendor specific information. Any DHCP server on the network will provide a DHCPOFFER packet with an IP address. If the DHCP server has been properly configured, the DHCPOFFER will also include the vendor specific cookie. If the cookie is not present, the NMC will accept the offered IP address lease and then release it. If a DHCPOFFER packet is not received or does not include the proper cookie, then the DHCP process will be repeated. The DHCP process may be repeated indefinitely or for a specified number of tries. According to an embodiment of the invention, if a timeout or failure occurs in response to the DHCPDISCOVER packet, then the NMC will not request network assignment again until it is rebooted (step 150). However, if a DHCPOFFER packet is received which does not include the cookie, the request will be repeated indefinitely, every 32 seconds, until a proper response is received. If a DHCPOFFER packet is received with the cookie, then the NMC starts the network (step 170).

The BootP Only mode 140 is used when the NMC previously booted using the BootP process. As with the other processes, the first step is to allow gleaning, step 141, as discussed above. If an IP address is not assigned using gleaning, then the NMC sends a BootP assignment request. If a valid BootP response is received, the NMC starts network services (step 170). If a timeout or failure occurs, the NMC will retry the BootP process. The BootP process may be retried indefinitely or for specified number of times.

The NMC may also use a static mode 150 in which the IP address and configuration information is manually set. If manually configured network settings exist, then the NMC will start operation using the static mode.

Figure 3:
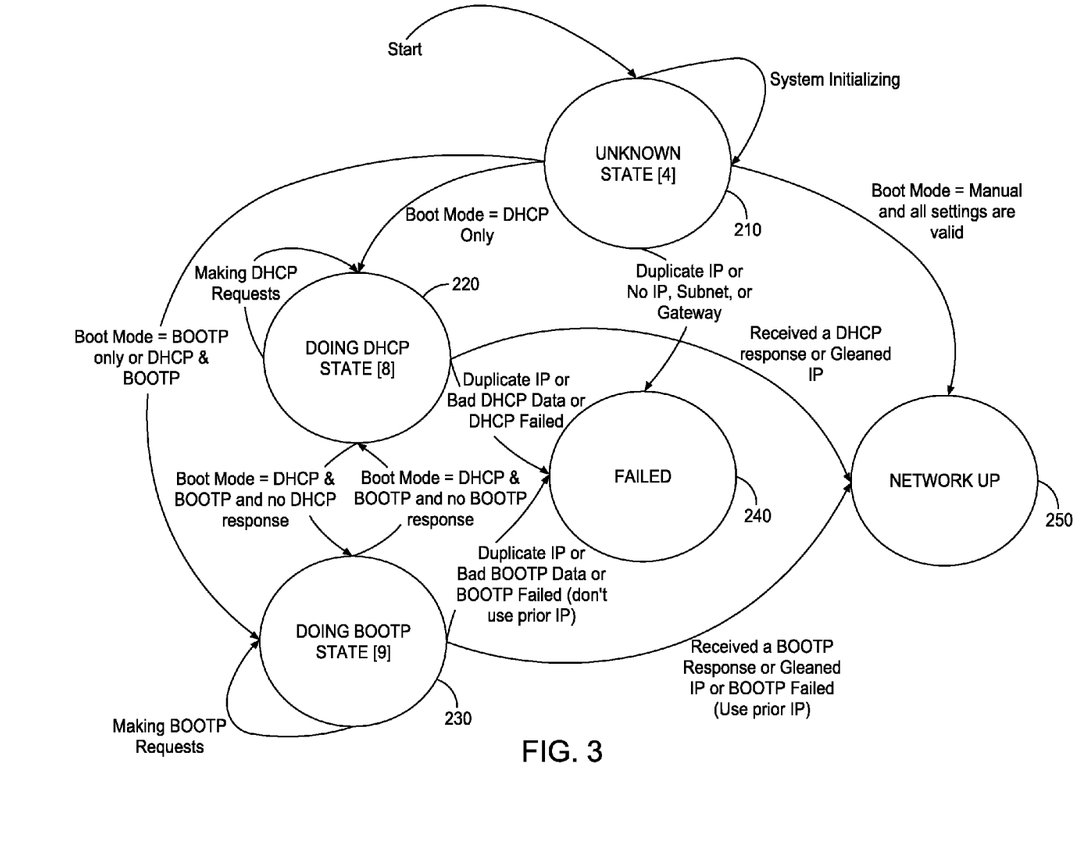
FIG. 3 is a state diagram of an IP allocation bootstrapping process according to an embodiment of the present invention.

FIG. 3 is a state diagram illustrating the states of the NMC in the IP allocation process. Upon starting, the NMC is in the unknown state. If manual network settings exist, then the NMS moves directly to the Network UP state 250, using the manual network settings. If the boot mode is "DHCP Only," then the NMS moves to the Doing DHCP state 220 until a valid response is received or the process fails. If a valid response is received including the proper cookie, then the NMS moves to the Network Up state 250. If the process fails, then the NMS moves to the Failed state 240. Similarly, if the boot mode is "BootP Only," then the NMS moves to the Doing BootP state 230 until a valid response is received or the process fails. If a valid response is received, then the NMS moves to the Network Up state 250. If the process fails, then the NMS moves to the Failed state 240. If the boot mode is DHCP/BootP, then the NMS moves from the unknown state 210 to the Doing BootP state 230. If a valid BootP response is received, the NMC moves to the Network Up state 250. If a valid BootP response is not received, the NMC then moves to the Doing DHCP state 220. Again, if a valid DHCP response is received, including the proper cookie, the NMC moves to the Network Up state 250. If a valid DHCP response is not received, then the NMC moves back to the Doing BootP state 230. After certain failures or a specified number of tries in either the Doing DHCP or Doing BootP states, the NMC may determine that a failure has occurred and move to the Failed state 240.

The present invention relates solely to the IP allocation process. The communications processes used to obtain IP allocation or after a network connection has been established operate according to accepted industry practices. The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method for allocating Internet Protocol (IP) addresses to an uninterruptible power supply including a network management card connected to a network through a communication line, the method comprising:
    determining, by the network management card based at least in part on a configurable boot mode setting, a first protocol for dynamic allocation of IP addresses, the configurable boot mode setting indicating one of Bootstrap Protocol (BootP) Only mode, Dynamic Host Configuration Protocol (DHCP) Only mode and DHCP/BootP mode, wherein the network management card determines that the first protocol is DHCP when the configurable boot mode setting indicates DHCP Only mode and the network management card determines that the first protocol is BootP when the configurable boot mode setting indicates either BootP Only mode or DHCP/BootP mode;
    executing, by the network management card, a first process for allocation of IP addresses using the first protocol through the communication line; and
    executing, by the network management card, selectively based at least in part on whether the executed first process successfully allocated an IP address and on whether the configurable boot mode setting indicates DHCP/BootP mode, a second process for allocation of IP addresses using a second protocol for dynamic allocation of IP addresses through the communication line, the second protocol being DHCP.

2. The method for allocating IP addresses to an uninterruptible power supply according to claim 1, the method further comprising executing, selectively based on whether the executed second process successfully allocated an IP address, a third process for allocation of IP addresses using the first protocol.

3. The method for allocating IP addresses to an uninterruptible power supply according to claim 1, the method further comprising executing a gleaning process for allocation of IP addresses to the uninterruptible power supply.

4. The method for allocating IP addresses to an uninterruptible power supply according to claim 1, wherein executing the second process comprises:
    transmitting on the network a DHCP discover packet which includes a vendor specific option;
    receiving from the network a DHCP offer packet, including an IP address allocation, in response to the DHCP discover packet;
    determining whether the DHCP offer packet includes a vendor specific response corresponding to the vendor specific option;
    returning a result indicative of whether the DHCP offer packet includes the vendor specific response; and
    allocating the IP address allocation from the DHCP offer packet to the uninterruptible power supply as a function of the returned result.

5. The method for allocating IP addresses to an uninterruptible power supply according to claim 4, wherein allocating the IP address allocation comprises:
    allocating the IP address allocation from the DHCP offer packet to the uninterruptible power supply; and
    releasing the IP address allocation from the DHCP offer packet if the DHCP offer packet does not include the vendor specific response.

6. The method for allocating IP addresses to an uninterruptible power supply according to claim 1 further comprising configuring a boot mode setting in response to a successful allocation of an IP address to the uninterruptible power supply.

7. The method for allocating IP addresses to an uninterruptible power supply according to claim 4, wherein allocating the IP address allocation includes:
    allocating the IP address allocation from the DHCP offer packet to the uninterruptible power supply; and
    retaining the IP address allocation from the DHCP offer packet if the DHCP offer packet includes the vendor specific response.

8. The method for allocating IP addresses to an uninterruptible power supply according to claim 1, wherein executing the first process for allocation of IP addresses comprises executing a first process using BootP and wherein executing, selectively based on whether the executed first process successfully allocated an IP address, the second process comprises executing a second process using DHCP.

9. The method for allocating IP addresses to an uninterruptible power supply according to claim 3, wherein executing the gleaning process comprises:
    receiving a PING including an Internet Control and Management Protocol (ICMP) packet;
    determining a buffer size of the ICMP packet; and
    allocating, selectively based on whether the buffer size is a particular buffer size, an IP address from the PING to the uninterruptible power supply.

10. The method for allocating IP addresses to an uninterruptible power supply according to claim 1, further comprising executing an IP communication protocol process using at least one IP address determined by at least one process of the first and the second processes.

11. A method for allocating Internet Protocol (IP) addresses to an uninterruptible power supply including network management card connected to a network through a communication line, the method comprising:

determining, by the network management card based at least in part on a configurable boot mode setting, a first protocol for dynamic allocation of IP addresses, the configurable boot mode setting indicating one of Bootstrap Protocol (BootP) Only mode, Dynamic Host Configuration Protocol (DHCP) Only mode and DHCP/BootP mode, wherein the network management card determines that the first protocol is DHCP when the configurable boot mode setting indicates DHCP Only mode and the network management card determines that the first protocol is BootP when the configurable boot mode setting indicates either BootP Only mode or DHCP/BootP mode;

executing, by the network management card, a first process for allocation of IP addresses using the first protocol through the communication line, the first process comprising:

transmitting, via the communication line on the network, a BootP allocation request;

receiving, from the network via the communication line, a BootP allocation response not including an IP address; and executing, by the network management card, selectively based at least in part on whether the configurable boot mode setting indicates DHCP/BootP mode, a second process for allocation of IP addresses using a second protocol for dynamic allocation of IP addresses through the communication line, the second process comprising:

transmitting, on the network via the communication line, a DHCP discover packet which includes a vendor specific option;

receiving, from the network via the communication line, a DHCP offer packet, including an IP address allocation, in response to the DHCP discover packet;

determining, by the network management card, whether the DHCP offer packet includes a vendor specific response corresponding to the vendor specific option;

returning, by the network management card, a result indicative of whether the DHCP offer packet includes the vendor specific response;

allocating, by the network management card, the IP address allocation from the DHCP offer packet to the uninterruptible power supply as a function of the returned result; and releasing, by the network management card, the IP address allocation from the DHCP offer packet if the DHCP offer packet does not include the vendor specific response.

12. An uninterruptible power supply connected to a network through a communication line, the uninterruptible power supply comprising:

means for determining, based at least in part on a configurable boot mode setting, a first protocol for dynamic allocation of Internet Protocol (IP) addresses, the configurable boot mode setting indicating one of Bootstrap Protocol (BootP) Only mode, Dynamic Host Configuration Protocol (DHCP) Only mode and DHCP/BootP mode, wherein the means for determining determines that the first protocol is DHCP when the configurable boot mode setting indicates DHCP Only mode and the means for determining determines that the first protocol is BootP when the configurable boot mode setting indicates either BootP Only mode or DHCP/BootP mode;

means for executing a first process for allocation of IP addresses using the first protocol through the communication line; and means for executing, selectively based at least in part on whether the executed first process successfully allocated an IP address and on whether the configurable boot mode setting indicates DHCP/BootP mode, a second process for allocation of IP addresses using a second protocol through the communication line, the second protocol being DHCP.

13. The uninterruptible power supply of claim 12, further comprising means for executing, selectively based on whether the executed second process successfully allocated an IP address, a third process for allocation of IP addresses using the first protocol.

14. The uninterruptible power supply of claim 12, further comprising means for executing a gleaning process for allocation of IP addresses.

15. The uninterruptible power supply of claim 12, wherein the means for executing the second process comprises:

means for transmitting, on the network, a DHCP discover packet which includes a vendor specific option;

means for receiving, from the network, a DHCP offer packet, including an IP address allocation, in response to the DHCP discover packet;

means for determining whether the DHCP offer packet includes a vendor specific response corresponding to the vendor specific option;

means for returning a result indicative of whether the DHCP offer packet includes the vendor specific response; and means for allocating the IP address allocation from the DHCP offer packet to the uninterruptible power supply as a function of the result returned.

16. The uninterruptible power supply of claim 15, wherein the means for allocating the IP address allocation comprises:

means for allocating the IP address allocation from the DHCP offer packet to the uninterruptible power supply; and means for releasing the IP address allocation from the DHCP offer packet if the DHCP offer packet does not include the vendor specific response.

17. The uninterruptible power supply of claim 12, further comprising means for configuring a boot mode setting as a function of a successful allocation of an IP address to the uninterruptible power supply.

18. The uninterruptible power supply of claim 15, wherein the means for allocating the IP address allocation comprises:

means for allocating the IP address allocation from the DHCP offer packet to the uninterruptible power supply; and means for retaining the IP address allocation from the DHCP offer packet if the DHCP offer packet includes the vendor specific response.

19. The uninterruptible power supply of claim 12, wherein the means for executing the first process uses BootP and the means for executing the second process uses DHCP.

20. The uninterruptible power supply of claim 14, wherein the means for executing the gleaning process comprises:

means for receiving a PING including an Internet Control and Management Protocol (ICMP) packet;

means for determining a buffer size of the ICMP packet; and means for allocating, selectively based on whether the buffer size is a particular size, an IP address from the PING to the uninterruptible power supply.

21. An uninterruptible power supply connected to a network through a communication line, the uninterruptible power supply comprising:
- means for determining, based on a configurable boot mode setting, a first protocol for dynamic allocation of Internet Protocol (IP) addresses, the configurable boot mode setting indicating one of Bootstrap Protocol (BootP) Only mode, Dynamic Host Configuration Protocol (DHCP) Only mode and DHCP/BootP mode, wherein the network management card determines that the first protocol is DHCP when the configurable boot mode setting indicates DHCP Only mode and the network management card determines that the first protocol is BootP when the configurable boot mode setting indicates either BootP Only mode or DHCP/BootP mode;
- means for executing a first process for allocation of IP addresses using the first protocol through the communication line, the means for executing the first process including:
  - means for transmitting on the network a BootP allocation request;
  - means for receiving from the network a BootP allocation; response not including an IP address; and
- means for executing, selectively based on whether the configurable boot mode setting indicates DHCP/BootP mode, a second process for allocation of IP addresses using a second protocol through the communication line, the means for executing, selectively based on whether the executed first process successfully allocated an IP address, the second process including:
  - means for transmitting on the network a DHCP discover packet which includes a vendor specific option;
  - means for receiving from the network a DHCP offer packet, including an IP address allocation, in response to the DHCP discover packet;
  - means for determining whether the DHCP offer packet includes a vendor specific response corresponding to the vendor specific option and returning a result indicative of whether the DHCP offer packet includes the vendor specific response; and
  - means for allocating the IP address allocation from the DHCP offer packet to the uninterruptible power supply as a function of the result returned.

* * * * *

UNITED STATES PATENT AND TRADEMARK OFFICE
CERTIFICATE OF CORRECTION

PATENT NO. : 7,912,958 B2  
APPLICATION NO. : 10/225569  
DATED : March 22, 2011  
INVENTOR(S) : Giglio et al.

Page 1 of 1

It is certified that error appears in the above-identified patent and that said Letters Patent is hereby corrected as shown below:

On the Title page of the patent, Item (73) Assignee:

American Power "Coversion" Corporation should read American Power --Conversion-- Corporation.

Signed and Sealed this  
Fourteenth Day of June, 2011

David J. Kappos  
*Director of the United States Patent and Trademark Office*